United States Patent [19]
Tamagawa et al.
[11] Patent Number: 4,610,924
[45] Date of Patent: Sep. 9, 1986

[54] SUPPORT OF PHOTOGRAPHIC PAPER

[75] Inventors: Shigehisa Tamagawa; Tetsuro Fuchizawa; Kazuyuki Koike, all of Fujinomiya, Japan

[73] Assignee: Fuji Photo Film Co., Ltd., Kanagawa, Japan

[21] Appl. No.: 564,009

[22] Filed: Dec. 21, 1983

[30] Foreign Application Priority Data

Dec. 21, 1982 [JP] Japan ................................ 57-224558

[51] Int. Cl.$^4$ ................................................ B32B 5/16
[52] U.S. Cl. ................................ 428/331; 428/423.1; 428/507; 428/511; 428/513; 430/537; 430/538; 430/950
[58] Field of Search ............... 428/331, 511, 513, 507, 428/423.1, 424.2; 430/538, 537, 950

[56] References Cited

U.S. PATENT DOCUMENTS

| | | | |
|---|---|---|---|
| 3,911,191 | 10/1975 | Guastella et al. | 428/513 |
| 3,914,522 | 10/1975 | Säverin | 428/513 |
| 4,145,480 | 3/1979 | Kusama et al. | 428/513 |
| 4,188,220 | 2/1980 | Kasugai et al. | 428/513 |
| 4,220,471 | 9/1980 | Date et al. | 430/538 |
| 4,242,396 | 12/1980 | Wilson et al. | 428/331 |
| 4,409,322 | 10/1983 | Ezaki et al. | 430/537 |

*Primary Examiner*—Edith Buffalow
*Attorney, Agent, or Firm*—Toren, McGeady, Stanger, Goldberg & Kiel

[57] ABSTRACT

A support of photographic paper one of whose surfaces is provided with a writing-retainable layer capable of retaining penciled characters, marks, ink, etc. The writing-retainable layer comprises crystalline silica having a number-average particle size of 0.1–3.0 μm and a film-forming organic polymer.

4 Claims, No Drawings

SUPPORT OF PHOTOGRAPHIC PAPER

BACKGROUND OF THE INVENTION

Field of the Invention

This invention relates to a support of photographic paper comprising a paper sheet coated with a polyolefin resin on both surfaces thereof. More particularly, the invention relates to a polyolefin-coated support of photographic paper whose back surface is provided with a writing-retainable layer comprising a crystalline silica and a film-forming organic polymer, whereby penciled characters, marks, ink, etc., can be firmly retained on the surface.

There has been previously employed as the photographic paper a baryte paper. Recently, however, a water-proof photographic paper comprising a paper sheet coated with a polyolefin resin on both surfaces thereof has been developed and employed to cope with requirement for a rapid development process. At the present time, most of the baryta papers have been replaced with the water-proof photographic papers. Generally, the water-proof photographic paper is coated with a photographic emulsion layer on one surface of the support (ordinarily, on a polyolefin layer containing a inorganic pigment such as titanium dioxide). In the present specification, the surface to be coated with the emulsion layer is referred to as "front surface", while a surface not to be coated with the emulsion layer and to reside opposite to the front surface is referred to as "back surface".

For a variety of purposes, it is desired that the back surface is able to receive and retain thereon characters, letter, marks, etc. of colorants such as oily and aqueous inks of ball-point pen or fountain pen, carbon colorant of pencil, and the like. Also desired is that the back surface can receive print.

However, since the water-proof photographic paper is coated with a polyolefin (generally, polyethylene), the surface is hydrophobic and not absorptive. Accordingly, it is difficult to write characters and the like on the surface with a pencil, fountain-pen, etc. Otherwise, scratches are liable to be given onto the surface when these writing means are applied thereonto. Further, the written characters rub off very easily, and this is also disadvantageous.

For providing the polyolefin coating surface with capacity for receiving the written or printed characters, etc. (referred to herein as "writing property"), a surface-roughening process by sand-blasting, embossing, etching with an acid or the like, etc., has been employed. However, the so processed polyolefin surface still does not have satisfactory writing property.

A variety of improvements have been proposed for eliminating the drawback on the writing property. Examples of the improvements are: inclusion of an inorganic pigment having a size of 1–40 μm in the back side polyolefin resin layer (Japanese Patent Provisional Publication No. 55(1980)-43528); provision of a layer comprising an aqueous silica sol and a water-soluble polymer such as polyvinyl alcohol or carboxymethylcellulose (Japanese Patent Publication No. 44(1969)-14884); provision of a layer comprising a aqueous silica sol and a water-insoluble polymer emulsion such as polyethylene emulsion (Japanese Patent Publication 50(1975)-36565); and provision of a coating layer containing a pigment such as clay (Japanese Utility Model Provisional Publication No. 52(1977)-169426).

However, these prior arts have their own drawbacks. For instance, the inclusion of an inorganic pigment having a size of 1–40 μm in the back side polyolefin resin layer is considered to be difficultly employed in practice, because the resin layer deteriorates by the inclusion, resulting in occurrance of cracks, etc., and pollution with the pigment is introduced into the preparation stage. In the case of providing a coating layer having the known composition, since the coating amount has to be large, such as around 5 $g/m^2$ and in certain cases more than 10 $g/m^2$, a number of restrictions are introduced into the process, for instance, in regard of the drying stage. Also diadvantageous is that the coating layer is liable to break away or dissolve in the photographic development process, or that the pigment is liable to break away from the coating layer under contact with other face after the developmemt stage.

SUMMARY OF THE INVENTION

The primary object of the invention is to provide a support for photographic paper having a coating layer for providing satisfactory writing property to the back surface of the support in which the coating layer can be so formed with a smaller amount of material as to difficultly dissolve or break away in the course or after the development process.

There is provided by the present invention a support of photographic paper comprising a paper sheet coated with a polyolefin resin on both surfaces thereof, in which the surface not to receive a photographic emulsion layer is provided thereon with a writing-retainable layer which comprises (a) crystalline silica having a number-average particle size of 0.1–3.0 μm and (b) a film-forming organic polymer.

DETAILED DESCRIPTION OF THE INVENTION

The photographic support, namely, the support for photographic paper, comprises a paper sheet coated with a polyolefin resin, and a writing-retainable layer having satisfactory writing property provided on the polyolefin resin layer of the back surface. The polyolefin resin layer of the front surface is to receive a photographic emulsion layer.

The paper sheet employed in the support of the invention is chosen from those generally employed in the art of the photographic support. For instance, the paper sheet can be prepared from natural pulps produced from broadleaf tree, needle-leaf tree, etc., and synthetic pulps such as fibrous polyethylene and polypropylene. Known as paper-making auxiliary agents such as sizing agents, paper-strength increasing agents, fillers, fixing agents, etc., can be optionally incorporated into the paper sheet. The thickness of the paper sheet generally ranges from 50 to 300 μm.

Examples of the polyolefin employable for the preparation of the polyolefin resin-coating layer of the support include homopolymers of α-olefins such as polyethylene and polypropylene and copolymers of α-olefins with other monomers. A high-density polyethylene, a low-density polyethylene, and their mixtures are preferred. The thickness of the resin-coating layer generally ranges from 15 to 50 μm. The resin-coating layer may contain pigments, fluorescent brightening agents, antioxidants, etc., if desired.

The crystalline silica contained in the writing-retainable layer of the photographic support of the invention has the number-average particle size of 0.1–3.0 μm, preferably 0.3–1.5 μm.

The crystalline silica defined as above provides to the layer the writing property superior to the other material does. If a crystalline silica having size less than the above range is employed, extremely poor writing property is given. A crystalline silica having size more than the above range brings about disadvantageously rough surface and is liable to break away from the coating layer in or after the development process.

In contrast, use of amorphous silica produced by a wet process or dry process, for instance, aqueous silica sol, or non-aqueous amorphous silica in place of the crystalline silica of the invention provides unsatisfactory writing property such as poor capacity for receiving penciled characters or other drawbacks such as excessive blotting of ink.

The film-forming organic polymer to be employed for forming the writing-retainable layer together with the crystalline silica functions as binder. The film strength provided by the organic polymer is now lower than the pencil hardness H (in accordance with the definition given in JIS D 0202), preferably 2H or higher. It has been discovered that the instant organic polymer gives a satisfactory writing property to the coating layer only in combination with the aforementioned crystalline silica having the specific size.

Examples of the organic polymer include gelatin, SBR, MBR, epoxy polymer, alkyd polymer and polyurethane. The organic polymer can be employed singly or in combination with a hardening agent. Among these polymers, gelatin and SBR are preferred. Particularly preferred is an SBR containing insoluble portion in the range of 60–90%, in which the value is determined by immersing the formed coating layer in tetrahydrofuran at 20° C.

The hardening agent can be chosen depending upon the kind of the organic polymer employed. Examples of the hardening agent include active vinyl compounds, active halogen compounds, epoxy compounds, methanesulfonic acid ester compound, carboimide compound, isoxazole compound, and active ester compounds. The employment of the hardening agent together with the organic polymer is effective in the improvement of the film hardness of the coating layer, as well as in prevention of blotting of ink. The amount of the hardening agent can be appropriately determined upon consideration of the photographic property, but generally the amount ranges from 0.5 to 5% by weight based on the amount of the organic polymer. The coating layer may contain other additives such as antistatic agents, defoaming agents, pH adjusting agents, surfactants for prevention of production of the coating-streak, if desired.

The coating solution for forming the aforementioned writing-retainable layer on the polyolefin layer can be in the form of an aqueous solution or an organic solution depending upon the nature of the organic polymer, for instance, water-soluble modified type, emulsion type, lacquer type, etc. The coating procedure can be carried out by a known process such as dip-coating, air-knife coating, curtain coating, roller coating, doctor coating, wire bar coating, slide coating and gravure coating. The polyolefin surface to be coated is preferably activated prior to the coating by a known process. Examples of the activating treatment include etching with acid, flame-treatment using gas burner, corona discharge treatment, and glow discharge treatment.

The thickness of the writing-retainable layer generally ranges from 0.1 to 1 μm, but the ratio of the thickness of the layer to the average size of the crystalline silica is a very important factor. The instant ratio preferably ranges from 1/3 to 3/1 to provide most satisfactory results using the material defined in the invention. If the thickness of the coating layer (writing-retainable layer) is less than the above range, the crystalline silica contained in the layer easily breaks away even under weak contact in or after the development process. If the thickness of the layer is more than the above range, only poor writing property is given. Moreover, such thick layer is economically diavantageous and is unfavorable in practicing an industrial process.

The present invention is further illustrated by the following examples.

EXAMPLES

Several coating solutions were prepared by introducing the film-forming organic polymer and silica of the compositions indicated in Table 1 into water in the amount indicated in Table 1.

TABLE 1

| Specimen | Composition | |
|---|---|---|
| Support 1 | SBR (S/B ratio = 70/30: pencil hardness 2H) | 60 g. |
| | Crystalline silica (size: 0.5 μm) | 20 g. |
| | Water | 1 l. |
| Support 2 | Gelatin (pencil hardness 3H, after addition of hardening agent) | 60 g. |
| | Hardening agent (2,4-dichloro-6-hydroxy-S-triazine sodium) | 0.5 g. |
| | Crystalline silica (size: 0.8 μm) | 20 g. |
| | Water | 1 l. |
| Support 3 | SBR (S/B ratio = 10/90: pencil hardness B) | 60 g. |
| | Crystalline silica (same in Support 1) | 20 g. |
| | Water | 1 l. |
| Support 4 | SBR (same in Support 1) | 60 g. |
| | Amorphous silica (size: 0.03 μm) | 20 g. |
| | Water | 1 l. |
| Support 5 | SBR (same in Support 1) | 60 g. |
| | Amorphous silica (size: 3.5 μm) | 20 g. |
| | Water | 1 l. |

Remarks:
The "size" means "number-average particle size. Supports 1 and 2 are for the present invention, and Supports 3–5 are for reference.

The five coating solutions were coated on the back surface of a polyethylene-coated paper by wire bar coating process to form a layer of 0.5 μm thick (dry basis thickness). On the adverse side surface, namely, front surface, was provided a black-and-white photographic emulsion layer. Thus, five photographic papers, i.e, Photographic Papers 1 and 2 embodying the present invention, and Photogrphic Papers 3–5 for reference were prepared.

The photographic papers were then evaluated on the writing property, i.e., capacity for retaining some characters written by pencil and blotting in the use of an oily ink, and behavior in the development process, i.e., break-away of silica. In the evaluation on the writing property, a surface smoothly receiving and firmly retaining pencil (hardness H)-written characters was given Mark A; a surface receiving and retaining the pencil-written characters in ordinary level was given Mark B; and a surface unsatisfactorily receiving and retaining the characters was given Mark C. This marking system was also applied in the writing property for the oily ink. In the behavior in the development process, Mark I means "good", while Mark II means "bad" indicating that break-away of the silica was observed.

The results are set forth in Table 2.

TABLE 2

| Specimen | Writing Property | | Behavior in |
| --- | --- | --- | --- |
| | Pencil | Oily Ink | Development |
| Photographic Paper | | | |
| 1 | A | A | I |
| 2 | A | A | I |
| Photographic Paper | | | |
| 3 | C | A | I |
| 4 | C | A | I |
| 5 | B | C | II |

The results given in Table 2 clearly indicate that the support for photographic paper (Photographic Supports 1 and 2) according to the invention are satisfactory in all of the properties.

We claim:

1. A support of photographic paper comprising a paper sheet coated with a polyolefin resin on both surfaces thereof, in which the surface not to receive a photographic emulsion layer is provided thereon with a writing-retainable layer which comprises crystalline silica having a number-average particle size of 0.1 to 0.3 μm and a film-forming organic polymer having a film strength higher than the pencil hardness H which is selected from the group consisting of gelatin, SBR, MBR and polyurethane, the ratio of the number-average particle size to the thickness of the writing-retainable layer ranging from 1/3 to 3/1, wherein said writing-retainable layer has a thickness ranging from 0.1 to 1 μm.

2. The support as claimed in claim 1 wherein said film-forming organic polymer is selected from the group consisting of gelatin and SBR.

3. The support as claimed in claim 2 wherein said film-forming organic polymer is SBR.

4. The support as claimed in claim 1 wherein said number-average particle size of crystalline silica ranges from 0.3 to 1.5 μm.

* * * * *